US012718542B2

(12) United States Patent
Willmott et al.

(10) Patent No.: US 12,718,542 B2
(45) Date of Patent: Aug. 25, 2026

(54) SYSTEM AND METHOD FOR LEVARGING MULTIPLE DESCRIPTIVE FEATURES FOR ROBUST FEW-SHOT IMAGE LEARNING

(71) Applicants: Robert Bosch GmbH, Stuttgart (DE); Carnegie Mellon University, Pittsburgh, PA (US)

(72) Inventors: Devin T. Willmott, Pittsburgh, PA (US); Zhili Feng, Pittsburgh, PA (US); Annamarie Elizabeth Bair, Pittsburgh, PA (US); Jeremy Kolter, Pittsburgh, PA (US)

(73) Assignees: Robert Bosch GmbH (DE); Carnegie Mellon University, Pittsburgh, PA (US)

( * ) Notice: Subject to any disclaimer, the term of this patent is extended or adjusted under 35 U.S.C. 154(b) by 551 days.

(21) Appl. No.: 18/217,133

(22) Filed: Jun. 30, 2023

(65) Prior Publication Data

US 2025/0005916 A1 Jan. 2, 2025

(51) Int. Cl.
*G06V 10/82* (2022.01)
*G06V 10/74* (2022.01)

(52) U.S. Cl.
CPC ............ *G06V 10/82* (2022.01); *G06V 10/761* (2022.01)

(58) Field of Classification Search
CPC .... G06V 10/82; G06V 10/761; G06V 10/774; G06V 10/46; G06V 10/764; G06V 10/766; G06N 3/045; G06N 3/0895; G06N 20/00
See application file for complete search history.

(56) References Cited

U.S. PATENT DOCUMENTS

| | | | | |
|---|---|---|---|---|
| 12,142,036 B2 * | 11/2024 | Zeng | ........................ | G06F 40/40 |
| 2010/0189354 A1 * | 7/2010 | de Campos | .......... | G06V 10/462 707/E17.071 |
| 2016/0267569 A1 * | 9/2016 | Hampson | .............. | G06F 16/248 |
| 2017/0287109 A1 * | 10/2017 | Tasfi | ..................... | G06T 3/4046 |
| 2018/0132725 A1 * | 5/2018 | Vogl | ..................... | A61B 5/0066 |

(Continued)

OTHER PUBLICATIONS

Alec Radford et al., "Learning transferable visual models from natural language supervision." In International Conference on Machine Learning, PMLR, 2021, pp. 8748-8763.

(Continued)

*Primary Examiner* — Solomon G Bezuayehu
(74) *Attorney, Agent, or Firm* — Dickinson Wright PLLC

(57) ABSTRACT

A system including a machine learning network that includes a controller configured to, utilizing numerical values assigned at an image-text similarity matrix, output at the machine learning network including a text encoder and an image encoder, update parameters of a untrained layer of the machine learning network utilizing sparse logistic regression to generate a sparse logistic regression layer, wherein the image-text similarity matrix is associated with a plurality of input images received at the controller, freeze one or more entries of the sparse logistic regression layer that include zero values, run a plurality of input images at both (1) the image encoder and (2) one or more unfrozen entries at the sparse logistic regression layer, and update, in response to the running of the plurality of input images, parameters of the image encoder and parameters associated with one or more unfrozen entries, and output a tuned machine learning model until a threshold is met.

20 Claims, 9 Drawing Sheets

(56) References Cited

U.S. PATENT DOCUMENTS

2019/0298207 A1* 10/2019 Morimoto .............. A61B 5/055
2021/0365719 A1* 11/2021 Kalyuzhner ......... G06V 10/758
2022/0391755 A1* 12/2022 Li ........................ G06V 30/153
2023/0162490 A1* 5/2023 Zhang ................... G06F 40/166
382/159
2023/0394855 A1* 12/2023 Xie ......................... G06F 40/40
2023/0401833 A1* 12/2023 Guo ..................... G06V 10/764
2024/0080487 A1* 3/2024 Hu ......................... H04N 19/31
2024/0144651 A1* 5/2024 Bulat ................... G06V 10/761
2024/0161520 A1* 5/2024 Li .......................... G06N 3/044
2024/0242455 A1* 7/2024 Peris ....................... G06T 19/20
2024/0265237 A1* 8/2024 Arya ...................... G06N 3/088
2025/0078454 A1* 3/2025 Saraee ................. G06V 10/761

OTHER PUBLICATIONS

Dan Hendrycks et al., The many faces of robustness: A critical analysis of out-of-distribution generalization. In Proceedings of the IEEE/CVF International Conference on Computer Vision 2021, pp. 8340-8349.

Sarah Pratt et al., What does a platypus look like? generating customized prompts for zeroshot image classification. arXiv preprint arXiv:2209.03320, 2022, 23 Pages.

Sachit Menon et al., "Visual classification via description from large language models." arXiv preprint arXiv:2210.07183, 2022, 17 Pages.

Ananya Kumar et al., "Fine-tuning can distort pretrained features and underperform out-of-distribution." arXiv preprint arXiv:2202.10054, 2022, 54 pages.

Mitchell Wortsman et al., "Robust fine-tuning of zero-shot models." In Proceedings of the IEEE/CVF Conference on Computer Vision and Pattern Recognition 2022, pp. 7959-7971.

Kaiyang Zhou et al., "Learning to prompt for vision-language models." International Journal of Computer Vision 2022, vol. 130, No. 9, pp. 2337-2348.

Daniel Khashabi et al., Prompt waywardness: The curious case of discretized interpretation of continuous prompts. arXiv preprint arXiv:2112.08348, 2021, 13 Pages.

Yue Yang et al., "Language in a bottle: Language model guided concept bottlenecks for interpretable image classification." arXiv preprint arXiv:2211.11158, 2022, 5 Pages.

Alec Radford et al., "Language models are unsupervised multitask learners." OpenAI blog. 1(8):9, 2019, 24 Pages.

Tom B Brown et al., "Language models are few-shot learners." arxiv 2020. arXiv preprint arXiv:2005.14165, 4, 2020, 75 Pages.

Teven Le Scao et al., "How many data points is a prompt worth?" arXiv preprint arXiv:2103.08493, 2021, 10 Pages.

Taylor Shin et al., "Autoprompt: Eliciting knowledge from language models with automatically generated prompts." arXiv preprint arXiv:2010.15980, 2020, 15 Pages.

Han Guo et al., "Text generation with efficient (soft) q-learning." arXiv preprint arXiv:2106.07704, 2021, 23 Pages.

Tianyu Gao et al., Making pre-trained language models better few-shot learners. arXiv preprint arXiv:2012.15723, 2020, 15 Pages.

Colin Raffel et al., "Exploring transfer learning with t5: the text-to-text transfer transformer." Journal of Machine Learning Research 21 (2020) 1-67 Submitted Jan. 2020; Revised Jun. 2020; Published Jun. 2020, 67 Pages.

Weijia Shi et al., "Toward human readable prompt tuning: Kubrick's the shining is a good movie, and a good prompt too?" arXiv preprint arXiv:2212.10539, 2022, 12 Pages.

Archiki Prasad et al., "Grips: Gradient-free, edit-based instruction search for prompting large language models." arXiv breprint arXiv:2203.07281, 2022, 20 Pages.

Mozes van de Kar et al., "Don't prompt, search! mining-based zero-shot learning with language models." arXiv preprint arXiv:2210.14803, 2022, 14 Pages.

Yongchao Zhou et al., "Large language models are human-level prompt engineers." arXiv preprint arXiv:2211.01910, 2022, 43 Pages.

Guanghui Qin et al., "Learning how to ask: Querying lms with mixtures of soft prompts." arXiv preprint arXiv:2104.06599, 2021, 11 Pages.

Brian Lester et al., "The power of scale for parameter-efficient prompt tuning." arXiv preprint arXiv:2104.08691, 2021, 15 Pages.

Xiao Liu et al., "Gpt understands, too." arXiv preprint arXiv:2103.10385, 2021, 10 Pages.

Ning Ding et al., "Openprompt: An open-source framework for prompt-learning." arXiv preprint arXiv:2111.01998, 2021, 9 Pages.

Karen Hambardzumyan et al., "Warp: Word-level adversarial reprogramming." arXiv preprint arXiv:2101.00121, 2021, 13 Pages.

Kaiyang Zhou et al., Conditional prompt learning for vision-language models.In Proceedings of the IEEE/CVF Conference on Computer Vision and Pattern Recognition, pp. 16816-16825, 2022.

Beier Zhu et al., "Prompt-aligned gradient for prompt tuning." arXiv preprint arXiv:2205.14865, 2022, 18 Pages.

Guangyi Chen et al. Prompt learning with optimal transport for vision-language models. arXiv preprint arXiv:2210.01253, 2022, 21 Pages.

Yuning Lu et al., "Prompt distribution learning." In Proceedings of the IEEE/CVF Conference on Computer Vision and Pattern Recognition, pp. 5206-5215, 2022.

Yuxin Wen et al., "Hard prompts made easy: Gradient-based discrete optimization for prompt tuning and discovery." arXiv preprint arXiv:2302.03668, 2023, 15 Pages.

Sachin Goyal et al., "Finetune like you pretrain: Improved finetuning of zero-shot vision models." arXiv preprint arXiv:2212.00638, 2022, 19 Pages.

Jia Deng et al., "Imagenet: A large-scale hierarchical image database." In 2009 IEEE conference on computer vision and pattern recognition, pp. 248-255. Ieee, 2009.

Dan Hendrycks et al., "Natural adversarial examples." In Proceedings of the IEEE/CVF Conference on Computer Vision and Pattern Recognition, pp. 15262-15271, 2021.

Benjamin Recht et al., "Do imagenet classifiers generalize to imagenet?" In International conference on machine learning, pp. 5389-5400. PMLR, 2019.

Haohan Wang et al., "Learning robust global representations by penalizing local predictive power." Advances in Neural Information Processing Systems, 32, 2019, 19 Pages.

Andrei Barbu et al., Objectnet: A large-scale bias-controlled dataset for pushing the limits of object recognition models. Advances in neural information processing systems, 32, 2019, 11 Pages.

Eric Wong et al., Leveraging sparse linear layers for debuggable deep networks. In International Conference on Machine Learning, pp. 11205-11216. PMLR, 2021.

Aaron Defazio et al., "Saga: A fast incremental gradient method with support for non-strongly convex composite objectives." Advances in neural information processing systems, 27, 2014, 15 Pages.

* cited by examiner

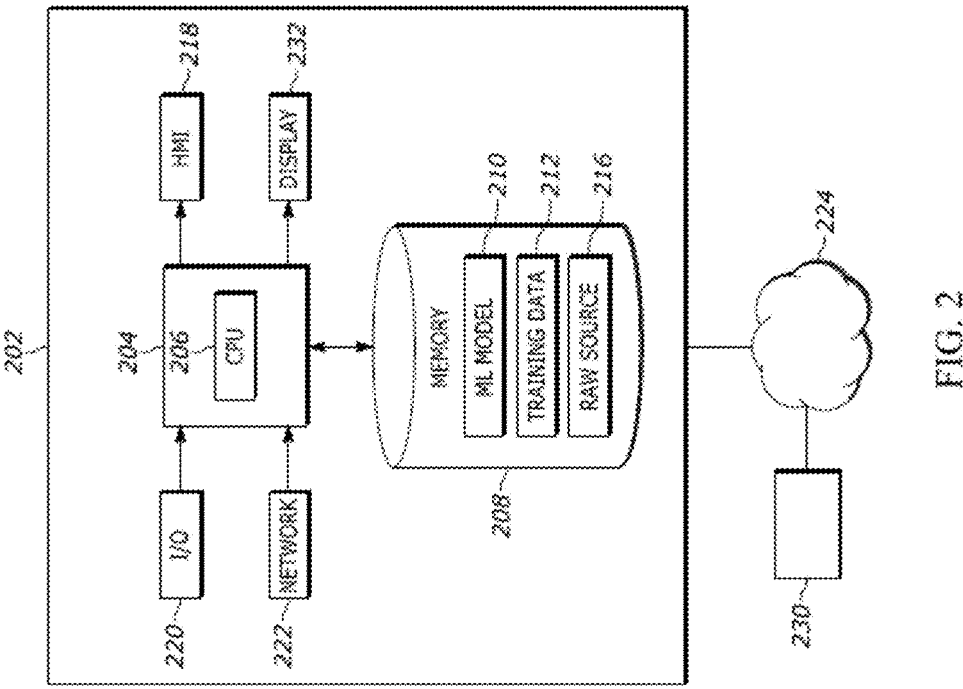
FIG. 2

SYSTEM AND METHOD FOR LEVARGING MULTIPLE DESCRIPTIVE FEATURES FOR ROBUST FEW-SHOT IMAGE LEARNING

TECHNICAL FIELD

The present disclosure relates to a machine learning network, including one that utilizes few-shot image learning.

BACKGROUND

Self-supervised vision-language models (VLMs) like a Contrastive Language-Image Pre-Training (CLIP) may create aligned image and text encoders via contrastive training. Unlike traditionally-trained classification networks, such alignment enables zero-shot image classification by prompting the text encoder with hand-crafted inputs like "a photo of { }" then predicting the target via the maximal inner product with the input image embedding. However, choosing effective prompts for zero-shot learning remains largely an ad-hoc process: some systems have added several prompts like "the cartoon { }" or "art of the { }" aiming to improve ImageNet-R performance, which improving standard. ImageNet accuracy as well. This has led to works that attempt to automatically extract relevant prompts from language models, including work that uses these models to extract multiple visual descriptors then use the average prediction of these visual descriptions to classify the image.

In the few-shot setting, however, where a small amount of training data is available, a number of techniques can further improve classifier performance beyond zero-shot prompting alone. For example, it has become commonplace to finetune zero-shot classifiers via linear probing or other approaches, including methods that interpolate between the zero-shot and finetuned classifiers to achieve better out-of-distribution robustness. Alternatively, one can also adapt the prompts themselves using this few-shot data, using e.g. techniques from soft prompt tuning, though these learned prompts are not readable, nor are their nearest dictionary projections. Finally, recent work has also looked at ways to combine automatically-extracted prompts using few-shot learning, though this approach used a very specific learned weighting over such descriptions, and its performance lagged behind simple linear probing for even small numbers of examples.

SUMMARY

A first illustrative embodiment illustrates computer-implemented method for tuning a pre-trained machine-learning network. The method includes receiving a plurality of input images, receiving a plurality of text data including image labels that are sent to a large language model (LLM) of the pre-trained machine-learning network, generating a plurality of visual descriptors utilizing the LLM and the plurality of text data, generating a text matrix utilizing the plurality of visual descriptors and a text encoder of the machine learning network, wherein the text matrix includes a list of encoded visual descriptors, generating a visual matrix utilizing the plurality of input images and an image encoder of the machine learning network, wherein the visual matrix includes a list of encoded images, multiplying the text matrix and the visual matrix to generate an image-text similarity matrix, wherein the image-text similarity matrix assigns a numerical value indicating similarities between each of encoded visual descriptors and each of the encoded images, wherein similarities are indicated by entries of the image-text similarity matrix having nonzero values, utilizing the numerical values assigned at the image-text similarity matrix, tuning the machine learning network by updating parameters of a untrained layer of the machine learning network utilizing sparse logistic regression to generate a sparse logistic regression layer, freezing one or more entries of the sparse logistic regression layer that include zero values, running the plurality of input images at both (1) the image encoder and (2) one or more unfrozen entries at the sparse logistic regression layer, and updating, in response to the running of the plurality of input images, parameters of the image encoder and parameters associated with one or more unfrozen entries, and outputting a tuned machine learning model after repeating certain steps until a threshold is met.

A second illustrative embodiment illustrates a computer-implemented method for tuning a pre-trained machine-learning network. The computer-implemented method comprising the steps of generating a text matrix utilizing one or more of visual descriptors associated with a large language model (LLM) of the network, and a text encoder of the machine learning network, wherein the text matrix includes a list of encoded visual descriptors, generating a visual matrix utilizing one or more of input images and an image encoder of the machine learning network, wherein the visual matrix includes a list of encoded images, multiplying the text matrix and the visual matrix to generate an image-text similarity matrix, wherein the image-text similarity matrix assigns a numerical value indicating similarities between each of encoded visual descriptors and each of the encoded images, wherein similarities are indicated by one or more entries of the image-text similarity matrix having nonzero values, utilizing the numerical values assigned at the image-text similarity matrix, updating parameters of a untrained layer of the machine learning network utilizing sparse logistic regression to generate a sparse logistic regression layer, freezing one or more entries of the sparse logistic regression layer that include zero values, running the plurality of input images at both (1) the image encoder and (2) one or more unfrozen entries at the sparse logistic regression layer; and updating, in response to the running of the plurality of input images, parameters of the image encoder and parameters associated with one or more unfrozen entries, and outputting a tuned machine learning model after running the images again and updating the parameters until a threshold is met.

A third illustrative embodiment illustrates a system including a machine learning network that includes a controller configured to, utilizing numerical values assigned at an image-text similarity matrix, output at the machine learning network including a text encoder and an image encoder, update parameters of a untrained layer of the machine learning network utilizing sparse logistic regression to generate a sparse logistic regression layer, wherein the image-text similarity matrix is associated with a plurality of input images received at the controller, freeze one or more entries of the sparse logistic regression layer that include zero values, run a plurality of input images at both (1) the image encoder and (2) one or more unfrozen entries at the sparse logistic regression layer, and update, in response to the running of the plurality of input images, parameters of the image encoder and parameters associated with one or more unfrozen entries, and output a tuned machine learning model until a threshold is met.

BRIEF DESCRIPTION OF THE DRAWINGS

FIG. 2 shows a computer-implemented method for training and utilizing a neural network, according to an embodiment.

FIG. 3 illustrates a block diagram according to an embodiment of machine learning network utilizing a sparse regression layer.

DETAILED DESCRIPTION

Figure 1:
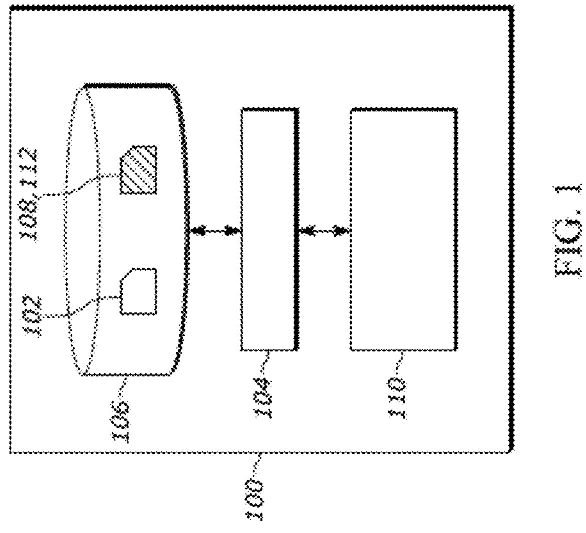
FIG. 1 shows a system for training a neural network, according to an embodiment.

Embodiments of the present disclosure are described herein. It is to be understood, however, that the disclosed embodiments are merely examples and other embodiments can take various and alternative forms. The figures are not necessarily to scale: some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

GPT-2 and 3 may include in-context learning paradigm of applying LLMs to downstream tasks, in which one provides a prompt to elicit a response or action, then optionally provides several demonstrations in this context.

Discrete Prompt Tuning AutoPrompt searches for a fixed-length prompt in a token-by-token greedy fashion. For each token position, they first select the top-k candidate tokens that align the most with the gradient of the log-likelihood, while fixing the prompts: then they select from the k candidates the one that maximizes the log-likelihood. The first step requires one forward backward pass of the model, and the second step takes k forward steps. This greedy algorithm generates prompts that are readable but not understandable. For example, they generate the following prompts for a sentiment analysis task: "a real joy. atmosphere a lot dialogue Clone totally [MASK]". Guo et al. uses Q-learning to generate prompts but still lacks comprehensibility. Gao et al. leverage T5 to generate prompt templates that contain the training pairs, and pick the best template based on the training data. Recently, Shi et al. proposed to sample human-readable prompts based on Langevin dynamics incorporated with a fluency constraint. There are also works that suggest prompt engineering via edit-based enumeration, data mining, and even LLMs themselves.

Continuous Prompt Tuning Continuous prompt tuning optimizes over the continuous text embedding space, usually through gradient descent with the training data while fixing the model parameters. These approaches are usually faster and more scalable compared to discrete prompt tuning, although the searched prompts are not semantically meaningful.

Prompt tuning in VLMs Contrastive VLMs aim to minimize the contrastive loss between matching image-text pairs. Let the image embedding be $f(p) \in \mathbb{R}^{(1+M) \times d}$, the text embedding be $g(t) \in \mathbb{R}^{(1+P) \times d}$. WLOG, let the first entry of the embeddings be the [CLS] token, denote as $g(t)_0$. The probability of the prediction is then represented as:

$$p\left(y = c \backslash p, t = \frac{\exp(\langle f(p)0, g(t_c)0 \rangle / T)}{\sum_c' \exp(\langle f(p)0, g(t_c')0 \rangle / T)}\right.$$

where $t_c$ is the zero-shot text prompt for class c. The class whose prompt has the largest inner product with the image embedding will be the zero-shot prediction. Zhou et al. optimizes over the embedding space of $x_T$ for the best prompts. Several follow-up works propose various prompt tuning methods for different task settings. The methods that eventually use $g(t_c)0$ are in essence regularized linear probing in the sense that the search space is constrained by the co-domain of $g(\cdot)_0$. Chen et al. uses local information of the image embedding $f_1, \ldots, f_M+1$ for optimizing an optimal transport distance between local image information and prompts. Lu et al. learns distributions over prompts for efficient adaptation to downstream recognition tasks. Wen et al. discusses discrete prompt search in the context of text-to-image settings.

Pratt et al. prompts LLMs for descriptions of each class and shows that these prompts can achieve better zeroshot image classification accuracy. Menon and Vondrick prompt LLMs to generate visual descriptors for image classification. For each class c, they query GPT-3 using the prompt "What are useful features for distinguishing a {c} in a photo?". A score is estimated for c given an image x:

$$s(c, x) = \frac{1}{|D(c)|} \sum_{d \in D(c)} \phi(d, x),$$

where D(c) is the number of descriptors for c, and $\phi(d; x) = \langle \mathrm{Encode}(d); \mathrm{Encode}(x) \rangle$ is the grounding between the image and text features. They show this average ensemble can outperform zero-shot classifiers while maintaining interpretability.

Some systems may consider per-class level descriptions in the few-shot setting. A key difference is that such systems perform a per-class level description filtering through submodular optimization, and they use a soft max-ed linear weight $\sigma(W)$ to ensemble the selected features. On the other hand, the system and method described below directly select features using sparse logistic regression. Such an approach immediately gives both the important features and the coefficients and is statistically optimal under certain sparsity assumptions. One of the potential drawbacks of prior systems is their visual descriptions are filtered per-class level, which can hinder feature sharing between classes. This partly explains why on ImageNet, such systems may start to underperform linear probing when k>=4. Since such systems focus on interpretability, they may enforce $\sigma(W)$ for a probabilistic interpretation, whereas the embodiment below may focus on robustness and only require W to be sparse. In one embodiment, the system may adopt WISE-FT to improve the out-of-distribution accuracy.

Let the finetuned weight be Φlearned and let the zero-shot predictor be $\Phi_{zs}$. The system may observe that while Φlearned performs better than $\Phi_{zs}$ on in-distribution tasks, it is worse at out-of-distribution tasks. Hence the system may propose to interpolate the two sets of weights as $\alpha\Phi_{learned}+(1-\alpha)\Phi_{zs}$. This surprisingly simple weight ensemble help both in distribution and out-of-distribution tasks. This method also naturally applies to linear probing by simply freezing the CLIP encoder throughout, and only training and interpolating the linear head.

Contrastive training allows CLIP for zero-shot classification via the usage of prompts like “a photo of {label}”. It may be beneficial to reason about the class of images with more detailed semantic features like “it has fur” or “it has a snout”? This kind of reasoning not only tells us to which class the image belongs but also why it belongs to the class. Arguably using multiple descriptive features to classify images may be more intuitive and interpretable to humans. The contrastive learning process does not explicitly tell the model why the image belongs to a certain class, the semantic differences between classes are still preserved in the image embedding space. Some of the semantic differences can even be abstract ideas that are unlikely to be visually discerned from the image. This phenomenon may be illustrated with the following example below. The system may randomly sample 500 plane images and 500 car images from the CIFAR-10 dataset, and compute their cosine similarity with 5 prompts:

1. “it has wings”
2. “it has four doors”
3. “a photo of an airplane”
4. “a photo of an automobile”
5. “it is lethal to crash”

The cosine similarities may be shown and plotted. There may be clear separations between classes using these prompts, even if the contrastive training does not necessarily associate prompts 1, 2, and 5 with the image themselves. A particularly interesting prompt is “it is lethal to crash”, as its intuition matches with that of humans that plane crashes are more dangerous than car accidents. Even if prompts 1, 2, and 5 are weaker separators compared to prompts 3 and 4, this observation leaves us with the possibility to ensemble many weak features for a good classifier.

Modern image classification is based upon directly predicting model classes via large discriminative networks, making it difficult to assess the intuitive visual “features” that may constitute a classification decision. At the same time, recent works in joint visual language models, such as CLIP, provide ways to specify natural language descriptions of image classes but typically focus on providing single descriptions for each class. In this work, the illustrative embodiments demonstrate that an alternative approach, arguably more akin to our understanding of multiple “visual features” per class, can also provide compelling performance in the robust few-shot learning setting. In particular, the system may automatically enumerate multiple visual descriptions of each class—via a large language model (LLM)—then use a vision-image model to translate these descriptions to a set of multiple visual features of each image. The system and method may finally use sparse logistic regression to select a relevant subset of these features to classify each image. This both provides an “intuitive” set of relevant features for each class, and in the few-shot learning setting, outperforms standard approaches such as linear probing. When combined with fine tuning, such a method is able to outperform existing state-of-the art fine tuning approaches on both in-distribution and out-of-distribution performance.

Reference is now made to the embodiments illustrated in the Figures, which can apply these teachings to a machine learning model or neural network. FIG. 1 shows a system 100 for training a neural network, e.g. a deep neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage. e.g., via a different subsystem of the data storage interface 104. Each subsystem may be of a type as is described above for the data storage interface 104. In other embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers. The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network. The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In other embodiments, the data representation 112 may be stored separately from the data representation 108 defining the 'untrained' neural network. In some embodiments, the output interface may be separate from the data storage interface 104, but may in general be of a type as described above for the data storage interface 104. The structure of the system 100 is one example of a system that may be utilized to train a pre-trained machine learning network that utilizes few-shot image learning described herein. Additional structure for operating and training the machine-learning models is shown in FIG. 2.

FIG. 2 depicts a system to implement the machine-learning models described herein, for example the pre-trained machine learning network that utilizes few-shot image learning described herein. The system 200 can be implemented to perform few-shot image learning described herein. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. During operation, the CPU 206 may execute stored program instructions that are retrieved from the memory unit 208. The stored program instructions may include software that controls operation of the CPU 206 to perform the operation described herein. In some examples, the processor 204 may be a system on a chip (SoC) that integrates functionality of the CPU 206, the memory unit 208, a network interface, and input/output interfaces into a single integrated device. The computing system 202 may implement an operating system for managing various aspects of the operation. While one processor 204, one CPU 206, and one memory 208 is shown in FIG. 2, of course more than one of each can be utilized in an overall system.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 is used to transfer information between internal storage and external input and/or output devices (e.g., HMI devices). The I/O 220 interface can includes associated circuitry or BUS networks to transfer information to or between the processor(s) and storage. For example, the I/O interface 220 can include digital I/O logic lines which can be read or set by the processor(s), handshake lines to supervise data transfer via the I/O lines: timing and counting facilities, and other structure known to provide such functions. Examples of input devices include a keyboard, mouse, sensors, etc. Examples of output devices include monitors, printers, speakers, etc. The I/O interface 220 may include additional serial interfaces for communicating with external devices (e.g., Universal Serial Bus (USB) interface).

The computing system 202 may include a human-machine interface (HMI) device 218 that may include any device that enables the system to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system may implement a machine-learning algorithm 210 that is configured to analyze the raw source dataset 216. The raw source dataset 216 may include raw or unprocessed sensor data that may be representative of an input dataset for a machine-learning system. The raw source dataset 216 may include video, video segments, images, text-based information, audio or human speech, time series data (e.g., a pressure sensor signal over time), and raw or partially processed sensor data (e.g., radar map of objects). The images may represent video or picture data may include a plurality of pixels that form a scene. A pixel may be the smallest addressable element in a raster image, or the smallest addressable element in a dot matrix display device. In most digital display devices, pixels may be the smallest element that can be manipulated through software. Each pixel may be a sample of an original or synthetic image. In one embodiment, more samples typically provide more accurate representations of the original. The intensity of each pixel may be variable. Several different examples of inputs are shown and described with reference to FIGS. 5-11. In some examples, the machine-learning algorithm 210 may be a neural network algorithm (e.g., deep neural network) that is designed to perform a predetermined function. For example, the neural network algorithm may be configured in automotive applications to identify street signs or pedestrians in images. The machine-learning algorithm(s) 210) may include algorithms configured to operate the pre-trained machine learning network that utilizes few-shot image learning described herein.

The computer system may store a training dataset 212 for the machine-learning algorithm 210. The training dataset 212 may represent a set of previously constructed data for training the machine-learning algorithm 210. The training dataset 212 may be used by the machine-learning algorithm 210 to learn weighting factors associated with a neural network algorithm. The training dataset 212 may include a set of source data that has corresponding outcomes or results that the machine-learning algorithm 210 tries to duplicate via the learning process. In this example, the training dataset 212 may include input images that include an object (e.g., a street sign). The input images may include various scenarios in which the objects are identified.

The machine-learning algorithm 210 may be operated in a learning mode using the training dataset 212 as input. The machine-learning algorithm 210 may be executed over a number of iterations using the data from the training dataset 212. With each iteration, the machine-learning algorithm 210 may update internal weighting factors based on the achieved results. For example, the machine-learning algorithm 210 can compare output results (e.g., a reconstructed or supplemented image, in the case where image data is the input) with those included in the training dataset 212. Since the training dataset 212 includes the expected results, the machine-learning algorithm 210 can determine when performance is acceptable. After the machine-learning algorithm 210 achieves a predetermined performance level (e.g., 100% agreement with the outcomes associated with the training dataset 212), or convergence, the machine-learning algorithm 210 may be executed using data that is not in the training dataset 212. It should be understood that in this disclosure, "convergence" can mean a set (e.g., predetermined) number of iterations have occurred, or that the residual is sufficiently small (e.g., the change in the approximate probability over iterations is changing by less than a threshold), or other convergence conditions. The trained machine-learning algorithm 210 may be applied to new datasets to generate annotated data.

The machine-learning algorithm 210 may be configured to identify a particular feature in the raw source data 216. The raw source data 216 may include a plurality of instances or input dataset for which supplementation results are desired. For example, the machine-learning algorithm 210 may be configured to identify the presence of a road sign in video images and annotate the occurrences. The machine-learning algorithm 210 may be programmed to process the raw source data 216 to identify the presence of the particular features. The machine-learning algorithm 210 may be configured to identify a feature in the raw source data 216 as a predetermined feature (e.g., road sign). The raw source data 216 may be derived from a variety of sources. For example, the raw source data 216 may be actual input data collected by a machine-learning system. The raw source data 216 may be machine generated for testing the system. As an example, the raw source data 216 may include raw video images from a camera.

In an example, the raw source data 216 may include image data representing an image. Applying the machine-learning algorithms (e.g., few-shot image learning, CLIP models, etc.) described herein, the output can be a tuned network associated with a set of images.

Figure 3:
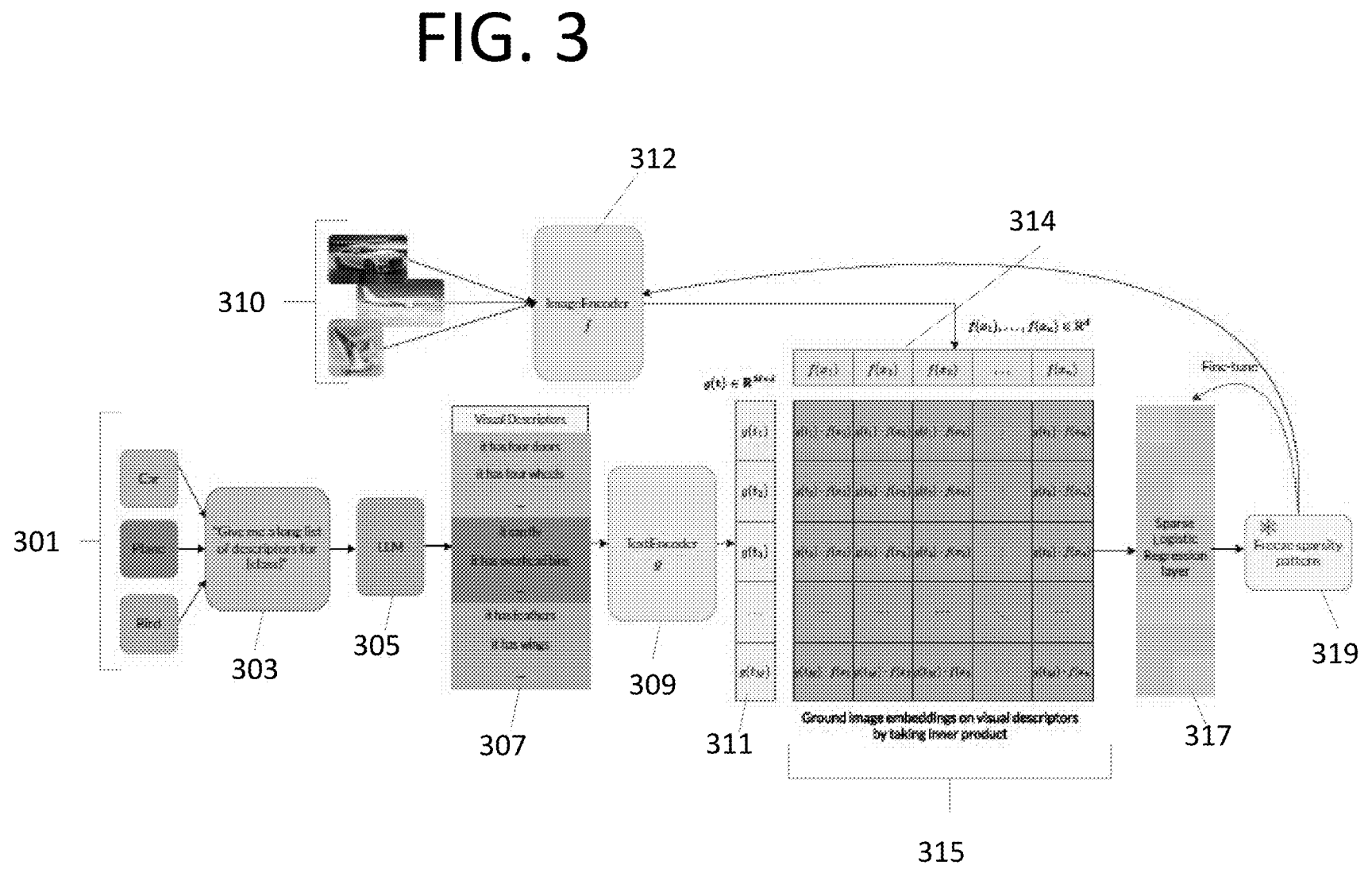

FIG. 3 illustrates an example of an embodiment of a system overview according to an embodiment. Text prompts 301, such as "car," "plane" and "bird" may be utilized for a label or plurality of labels. In one example, the input to the LLM 305 may be a prompt for visual descriptors 303 for each class (e.g., "Give me a list of visual descriptors for cars", "Give me a list of visual descriptors for planes", etc.). Then the output of the LLM 305 may be the list 307 of visual descriptors for each class (e.g., "Cars have bumpers", "Planes have wings", etc.). These visual descriptors 307 are what are then fed to the text encoder 309, such as a CLIP text encoder. The visual descriptors 307, in one example, may be "it has four doors," "it has four wheels," "it has feathers," "it has wings," "it can fly," and "it has overhead bins."

Images 310 may be fed to an image encoder 312, identify as f. Throughout the description, g(·) may be utilized to denote the text encoder 307 and f(·) to denote the image encoder 312. The system may use t for text tokens and p for images 310. For a vector v, subscript $v_i$ represents the ith entry. The system may overload the notation $t_c$ to represent a vector belonging to a class c, this should be clear from the context. The system may generate features, select a sparse set of useful descriptions, and finally, align the encoder.

To generate the visual descriptors for ImageNet and its variations, the system may first use the following prompt 303 to query the LLM 305 (e.g., GPT-3): "Give me a long list of descriptions for {label}:". GPT-3 may be quite sensitive to format instruction. Using the prompt "Give me a list" may lead to a list format, making it straightforward to select the useful text with regular expressions. In such an example, the list may not explicitly ask the LLM (e.g., GPT-3) for visual features. In one example, even abstract text can be used for classification. The system may condition these descriptors on the class name, using texts of the form "{c} | which has $t_c^i$"

for each class c and the ith descriptor. For each class c, the system may gather $M_c$ descriptors from GPT-3.

Furthermore, for each class, there exists a set of hand-crafted prompt templates like "a photo of { }" or "an art of { }". If there are T total number of such templates, using the class name c, the system can generate T total prompt embeddings for each class. The system may take the average of these prompt embeddings in addition to the aforementioned visual descriptors, leading to $M_c+1$ number of prompts for each class. For simplicity, the system may refer to the GPT-3 generated text features as visual descriptors (VD), the templates with class names as class prompts, and the union as augmented visual descriptors (AVD). The embeddings may be referred to using the same names.

If the system denotes $M=\Sigma_{c\in C}M_c$ the visual descriptors, class prompts, and augmented visual descriptors can be encoded into three matrices $U_{vd}\in\mathbb{R}^{M\times d}$, $U_{cp}\in\mathbb{R}^{|C|\times d}$, $U_{avd}\in\mathbb{R}^{(M+|C|\times d}$. Given an image embedding $z:=f(p)0\in\mathbb{R}^{d}$, these three matrices respectively created three sets of groundings $h_{vd}=U_{vd}z$, $h_{cp}=U_{cp}z$, and $h_{avd}=U_{avd}z$. $U_{vd}$ may refer to the text matrix 311 in one example. All three U matrices may be fixed and never trained. With the grounded features h, the system can learn three matrices $W_{vd}\in\mathbb{R}^{|C|\times M}$, $W_{cp}\in\mathbb{R}^{|C|\times|C|}$, $W_{avd}\in\mathbb{R}^{|C|\times(M+|C|}$. Setting $$W_{vd}=blkdiag\left(\underbrace{\left\{\frac{1}{|M_c|},\ \cdots\ \frac{1}{|M_c|}\right\}}_{|M_c|\text{ copies}}c\in C\right),$$

then $W_{vd}U_{vd}$ leads to the average ensemble. In one example, $h_{avd}$ may refer to an image-text similarity matrix. Setting $W_{cp}=I_{|C|\times|C|}$, the system may get back the zeroshot classifier $W_{zs}=W_{cp}U_{cp}$. One can naturally merge $W_{vd}$ and $W_{cp}$ into $W_{avd}=[W_{vd}, W_{cp}]$. $W_{avd}$ may also be referred to as the sparse logistic regression layer 317. In one example, these three matrices may all serve as zero-shot classifiers. Thus the matrices shown in FIG. 3 can be referred to as a text matrix 311, image matrix 314, and an image-text similarity matrix 315.

Learning sparse visual descriptors ensemble. The previously defined matrix $U_{avd}$ can be viewed as a linear projection of the image embedding onto a M+|C| dimensional semantic space. While this space has a high ambient dimension, the projected embeddings live in a lowdimensional manifold that has rank less than or equal to that of the image embedding space. By enforcing a sparsity constraint on $W_{avd}$, the system can select the most important dimensions among $U_{avd}$. The system can demonstrate that the selected subspace is also robust to natural distribution shifts. Intuitively, the large distribution shift in the image embedding space may only correspond to a small shift in the semantic space, since the semantics of images should be invariant.

With a fixed $U_{avd}$, the system may learn $W_{avd}$ with $\ell_1$ regularization $\|W_{avd}\|1$. Not only does sparse logistic regression select the important features, but it actually also finds the intuitive features. On CIFAR-10 (or another dataset of a collection of images used for training a network), the system may demonstrate that the selected features are usually the ones that actually describe that class. For each class, the system may pick the 3 features with the largest coefficients, in one embodiment.

After obtaining a sparse $\hat{W}_{avd}$, the system may fix $U_{avd}$ and the sparsity pattern of $\hat{W}_{avd}$, and fine-tune both the image encoder f, as well as the entries in $\hat{W}_{avd}$. Thus, the system may prompt GPT-3 for a list of visual descriptors for each class and encode these texts. The image embeddings are grounded to these descriptors by taking inner products. For an image embedding in $\mathbb{R}^{d}$, this operation projects it onto a $\mathbb{R}^{M}$ dimensional space, but it may live in a submanifold. The system may apply sparse logistic regression 317 over all $\mathbb{R}^{n\times M}$ training data for feature selection. Finally, the system may freeze 319 the sparsity pattern. Thus, any zero values associated with the sparse logistic regression layer 317 may be frozen. The images may be ran through the image encoder 312 with the adjusted parameters, as well as with the updated matrices with frozen entries. Such steps may be repeated until a convergence threshold is met, a number of iterations is met, a loss function threshold is met, etc.

Figure 4:
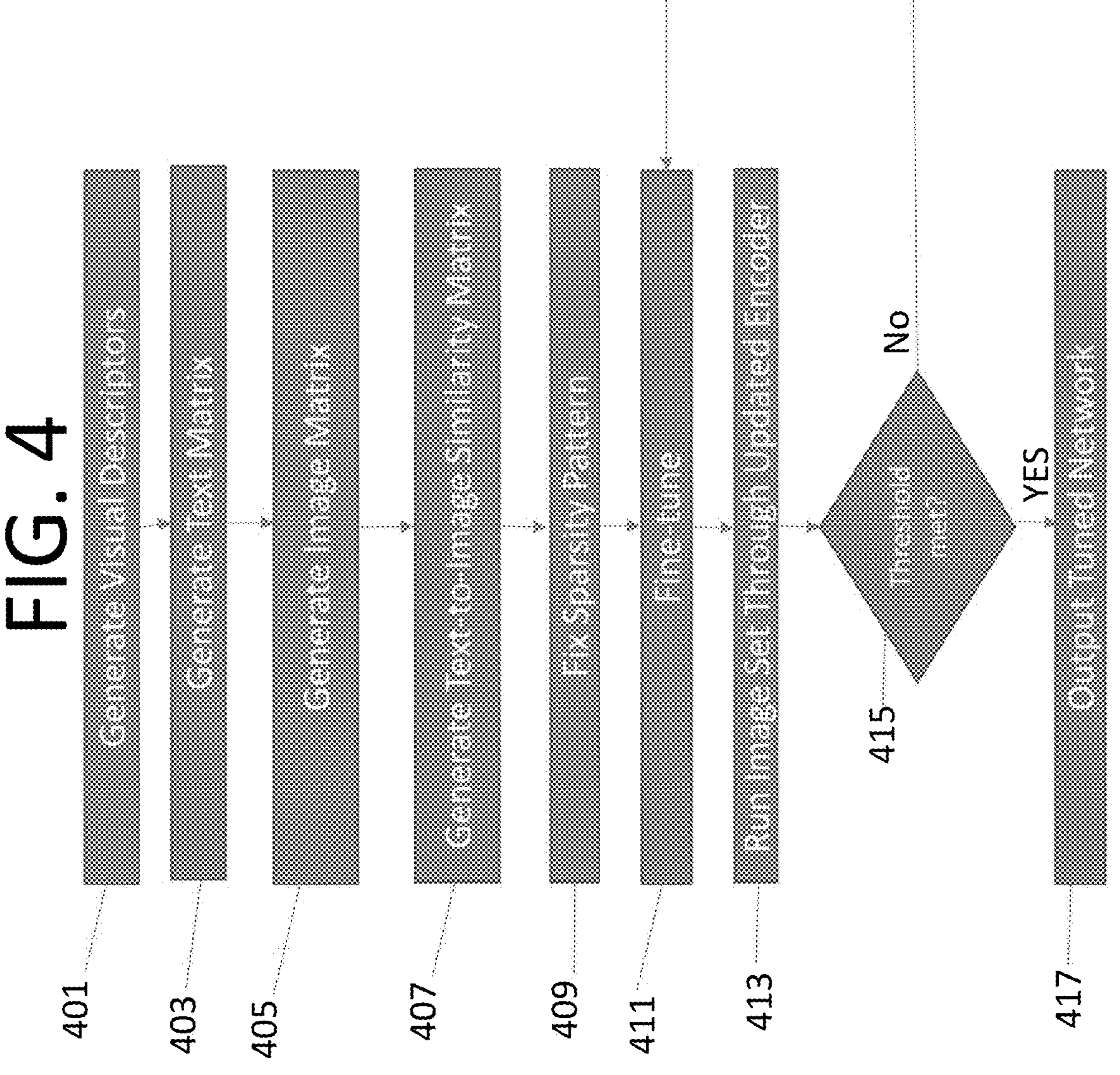
FIG. 4 illustrates a flow chart of an embodiment utilizing a sparse regression layer.

FIG. 4 illustrates a flow chart of an illustrative embodiment utilizing a sparse regression layer. LM may be utilized as the language model. C may be utilized as set of classes. $T=\{t_1, t_2, \ldots, t_M\}$ may be utilized as set of visual descriptors. f may be utilized to define an image encoder, such as a CLIP image encoder. g may be utilized as a text encoder, such as a CLIP text encoder. In one example, d may be utilized to define a latent dimension of the CLIP model. In another example, $X=\{x_1, x_2, \ldots, x_n\}$: train set of images. A set of image labels may be denoted as $Y=\{y_1, \ldots, y_n\}$:, where $y_i$ is the label for $x_i$. The matrix of one-hot encodings of each may be shown as $\hat{Y}\in\mathcal{R}^{n\times|C|}$: i.e.

$$\hat{Y}_{ij}=\begin{cases}1 & \text{if } x_i \text{ belongs to class } j\\ 0 & \text{otherwise}\end{cases}.$$

The training algorithm may be utilized to train each class c. For each class c, the system may set LM (language model) to generate $M_c$ (number of visual descriptors of class c) visual descriptors of class c at step 401. M may indicate a total number of visual descriptors (so $M=\Sigma_{c\in C}M_c$). One way to do this would be to prompt the LM with the text "Give me a long list of descriptions of {class name}", and select $M_c$ descriptors from among the list of outputs. At step 403, the system may generate a matrix $U\in\mathcal{R}^{M\times d}$ where row i is generated by $g(t_i)$: this is the list of encoded visual descriptors. At step 405, the system may generate a matrix $Z\in\mathcal{R}^{n\times d}$ where row i is $f(x_i)$: which may be a list of encoded images. At step 407, the system may multiply $ZU^T$ to obtain $H\in\mathcal{R}^{n\times M}$, where $H_{ij}$ denotes the similarity between image $x_i$ and visual descriptor $t_j$. It may be useful to think of column i of this matrix as a set of features of image $x_i$, where each features is a number describing how much one of the visual descriptor applies to image $x_i$. Let $W\in\mathcal{R}^{M\times|C|}$. The system may train the parameters of W to fit the equation $HW=\hat{Y}$ via sparse logistic regression (that is, train the entries of the matrix with $l_1$ regularization on the entries of W). The method may include tuning the sparse logistic regression layer at step 408. As such, the system may utilize the numerical values assigned at the image-text similarity matrix to tune the machine learning network by updating parameters of a untrained layer of the machine learning network utilizing sparse logistic regression to generate a sparse logistic regression layer. At step 409, the system may fix the sparsity pattern of W, for example, force the matrix entries that equal to 0) to remain 0. This may generate a sparsity pattern layer with unfrozen entries. At step 411, the system may fine-tune both the nonzero entries of W and the parameters of the image encoder f. At step 413, the system may run the image set again through the updated image encoder (e.g., image encoder with updated parameters) and via the sparse logistic regression layer with the unfrozen entries (e.g, not utilizing the frozen entries). At decision 415, the system may decide if a threshold is met to determine whether or not to output a newly tuned machine learning model. The threshold may be a number of iterations (e.g., iterations threshold), a convergence threshold, a loss function algorithm, etc. If the threshold is met, the system may output a tuned machine learning model at step 417. If the threshold is not met, the system may update the image encoder parameters and continue to re-run the image set again with an updated image encoder parameter and the sparse logistic regression layer with the unfrozen entries. Thus, the image encoder parameters may be updated until a threshold is met.

Figures 5, 6:
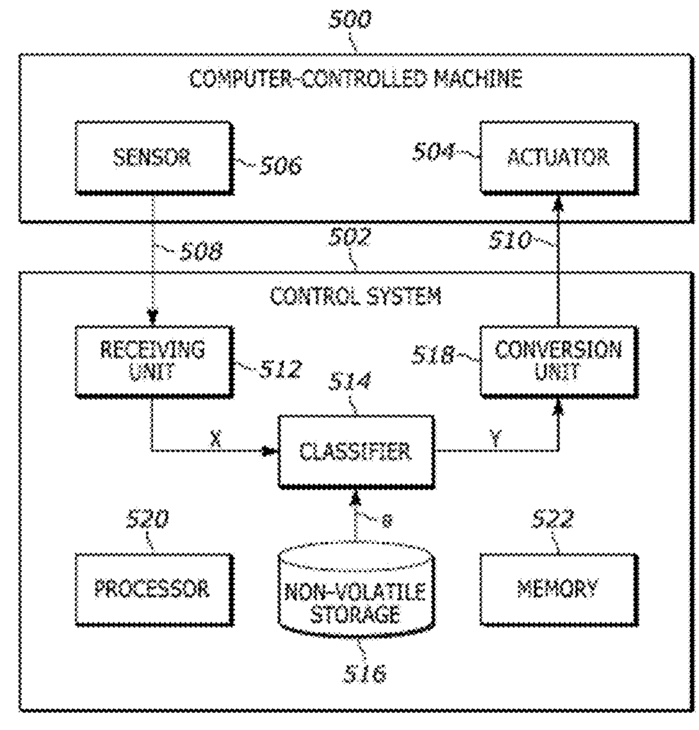
FIG. 5 depicts a schematic diagram of an interaction between a computer-controlled machine and a control system, according to an embodiment.
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to an embodiment.

FIG. 5 depicts a schematic diagram of an interaction between a computer-controlled machine 500 and a control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. Image data may be retrieved from these sensors, such as video images, picture images, radar images, sound images, etc. In one embodiment, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes a classifier 514. Classifier 514 may be configured to classify input signals x into one or more labels using a machine learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In another embodiment, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In another embodiment, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., machine-learning algorithms, such as those described above with regard to the image encoder or text encoder) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. In the context of sign-recognition and processing as described herein, the sensor 506 is a camera mounted to or integrated into the vehicle 600. Alternatively or in addition to one or more specific sensors identified above, sensor 506 may include a software module configured to, upon execution, determine a state of actuator 504. One non-limiting example of a software module includes a weather information software module configured to determine a classification of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In embodiments where vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In other embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In another embodiment, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
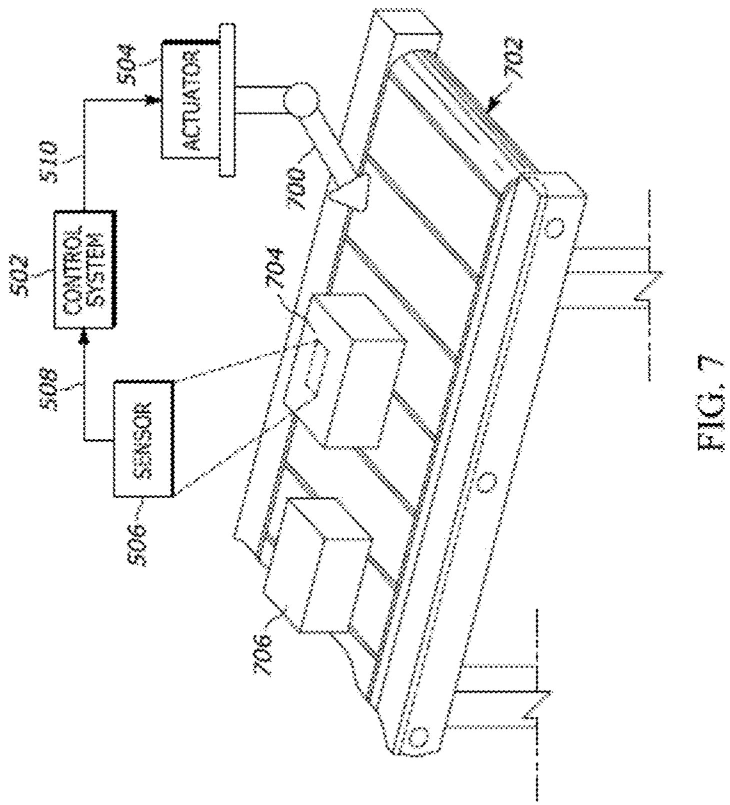
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 106 of system 700 (e.g., manufacturing machine) depending on the determined state of manufactured product 704.

Figure 8:
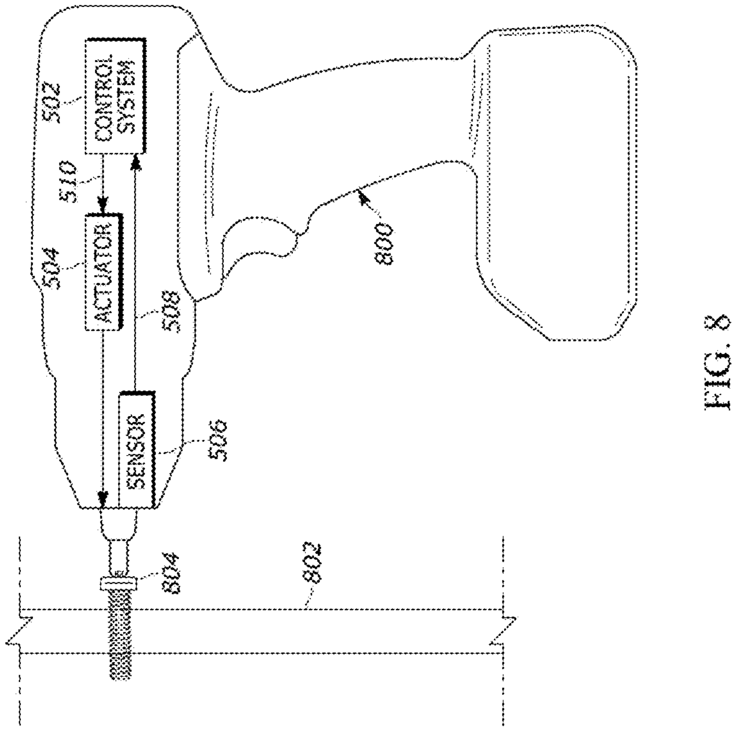
FIG. 8 depicts a schematic diagram of the control system of FIG. 5 configured to control a power tool, such as a power drill or driver, that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figures 9, 10:
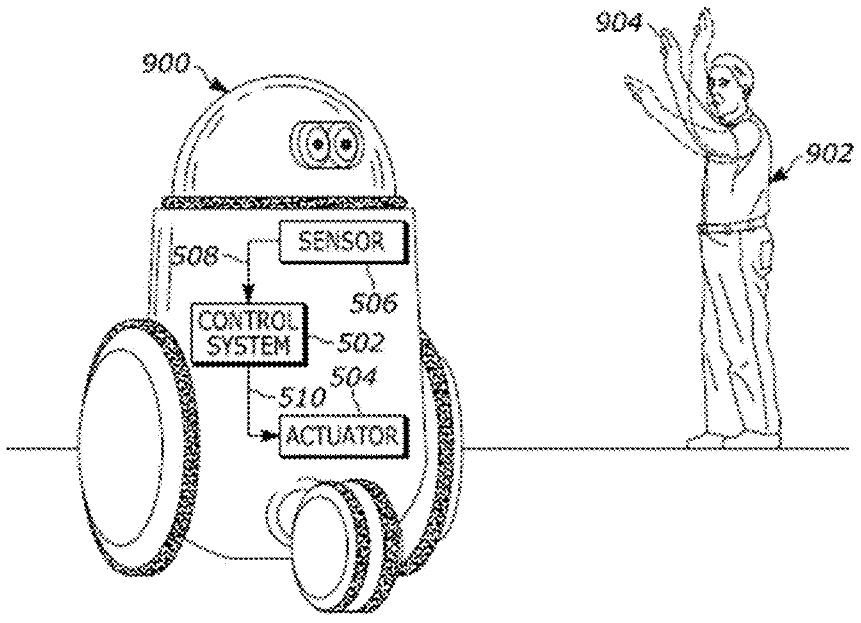
FIG. 9 depicts a schematic diagram of the control system of FIG. 5 configured to control an automated personal assistant.
FIG. 10 depicts a schematic diagram of the control system of FIG. 5 configured to control a monitoring system, such as a control access system or a surveillance system.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In other embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may identify such objects and assign a class or descriptor to them.

Figure 11:
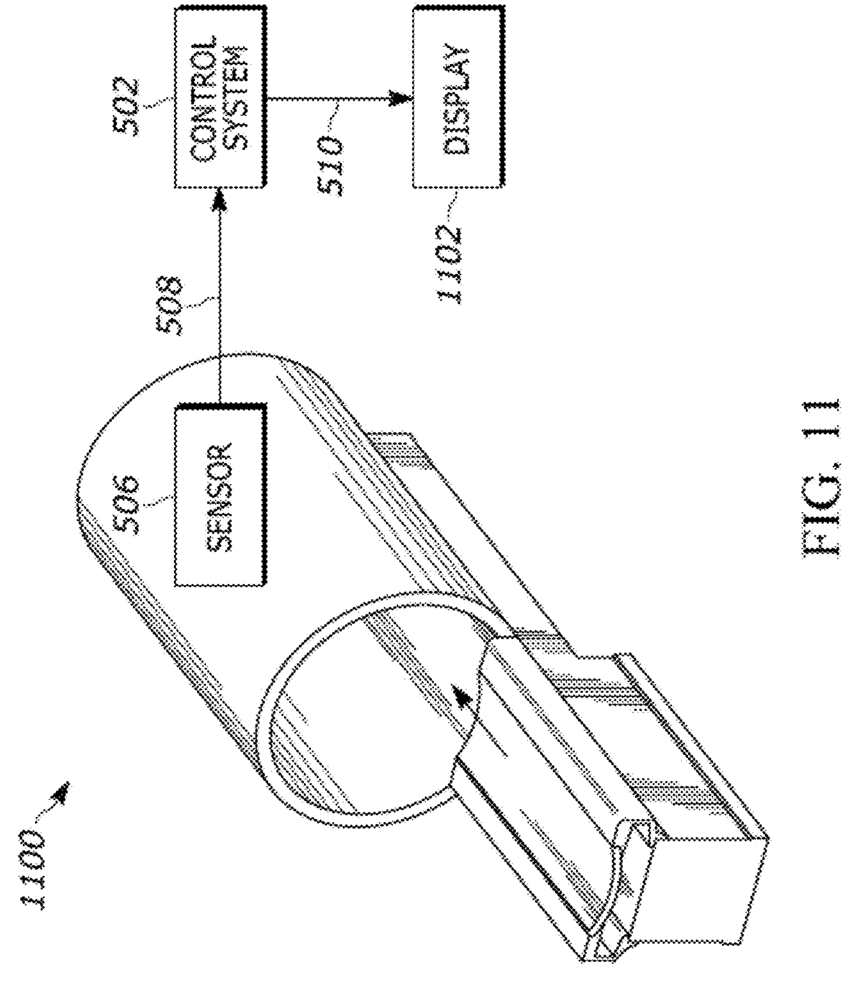
FIG. 11 depicts a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous and assign a class or descriptor to the sensed image. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method for tuning a pre-trained machine-learning network, the computer-implemented method comprising the following steps:

(i) receiving a plurality of input images that include a plurality of pixels;

(ii) receiving a plurality of text data including image labels that are sent to a large language model (LLM) of the pre-trained machine-learning network;

(iii) generating a plurality of visual descriptors utilizing the LLM and the plurality of text data;

(iv) generating a text matrix utilizing the plurality of visual descriptors and a text encoder of the machine learning network, wherein the text matrix includes a list of encoded visual descriptors;

(v) generating a visual matrix utilizing the plurality of input images and an image encoder of the machine learning network, wherein the visual matrix includes a list of encoded images;

(vi) multiplying the text matrix and the visual matrix to generate an image-text similarity matrix, wherein the image-text similarity matrix assigns a numerical value indicating similarities between each of encoded visual descriptors and each of the encoded images, wherein similarities are indicated by entries of the image-text similarity matrix having nonzero values;

(vii) utilizing the numerical values assigned at the image-text similarity matrix, tuning the machine learning network by updating parameters of a untrained layer of the machine learning network utilizing sparse logistic regression to generate a sparse logistic regression layer;

(viii) freezing one or more entries of the sparse logistic regression layer that include zero values;

(ix) running the plurality of input images at both (1) the image encoder and (2) one or more unfrozen entries at the sparse logistic regression layer; and (x) updating, in response to the running of the plurality of input images, parameters of the image encoder and parameters associated with one or more unfrozen entries; and (xi) outputting a tuned machine learning model after repeating steps (ix-x) until a threshold is met.

2. The method of claim 1, wherein the text encoder is a contrastive language-image pre-training (CLIP) text encoder and the image encoder is a CLIP image encoder.

3. The method of claim 1, wherein the parameters of the image encoder and parameters associated with one or more unfrozen entries are updated in response to a neural network optimization algorithm.

4. The method of claim 1, wherein the threshold is a number of iterations.

5. The method of claim 1, wherein the threshold is a convergence threshold.

6. The method of claim 1, wherein the large language model is Large Language Model Meta AI (LLaMA).

7. The method of claim 1, wherein the image-text similarity matrix is a matrix of one-hot encodings of each image.

8. A computer-implemented method for tuning a pre-trained machine-learning network, the computer-implemented method comprising the following steps:

(i) generating a text matrix utilizing one or more of visual descriptors associated with a large language model (LLM) of the network, and a text encoder of the machine learning network, wherein the text matrix includes a list of encoded visual descriptors;

(ii) generating a visual matrix utilizing one or more of input data indicative of images and an image encoder of the machine learning network, wherein the visual matrix includes a list of encoded images, wherein the images include video data, sonar data, audio data, LiDar data, or picture data;

(iii) multiplying the text matrix and the visual matrix to generate an image-text similarity matrix, wherein the image-text similarity matrix assigns a numerical value indicating similarities between each of encoded visual descriptors and each of the encoded images, wherein similarities are indicated by one or more entries of the image-text similarity matrix having nonzero values;

(iv) utilizing the numerical values assigned at the image-text similarity matrix, updating parameters of a untrained layer of the machine learning network utilizing sparse logistic regression to generate a sparse logistic regression layer;

(v) freezing one or more entries of the sparse logistic regression layer that include zero values;

(vi) running the input data indicative of images at both (1) the image encoder and (2) one or more unfrozen entries at the sparse logistic regression layer; and (vii) updating, in response to the running of the plurality of input images, parameters of the image encoder and parameters associated with one or more unfrozen entries; and (viii) outputting a tuned machine learning model after repeating steps (vi-vii) until a threshold is met.

9. The method of claim 8, wherein the tuned machine learning model is tuned with respect to the plurality of input images.

10. The method of claim 8, wherein the input data indicative of images are video, picture, radar, sonar, sound, or other image information.

11. The method of claim 8, wherein the LLM includes over a ten million parameters associated with the LLM, and the parameters associated with the LLM are not updated.

12. The method of claim 8, wherein the threshold is a convergence threshold.

13. The method of claim 8, wherein the large language model is ChatGPT.

14. The method of claim 8, wherein the image-text similarity matrix is a matrix of one-hot encodings of each image.

15. A system including a machine learning network, comprising:

a processor programmed to:

utilizing numerical values assigned at an image-text similarity matrix output at the machine learning network including a text encoder and an image encoder, update parameters of a untrained layer of the machine learning network utilizing sparse logistic regression to generate a sparse logistic regression layer, wherein the image-text similarity matrix is associated with a plurality of input data indicative of images received at the processor, wherein the images include video data, sonar data, audio data, LiDar data, or picture data;

freeze one or more entries of the sparse logistic regression layer that include zero values;

run a plurality of input images at both (1) the image encoder and (2) one or more unfrozen entries at the sparse logistic regression layer; and update, in response to the running of the plurality of input images, parameters of the image encoder and parameters associated with one or more unfrozen entries; and output a tuned machine learning model until a threshold is met.

16. The system of claim 15, wherein the tuned machine learning model is output after repeating to update parameters of the image encoder and parameters associated with one or more unfrozen entries.

17. The system of claim 15, wherein the numerical values indicate similarities between each of encoded visual descriptors and each of the encoded images, wherein similarities are indicated by one or more entries of the image-text similarity matrix having nonzero values.

18. The system of claim 15, wherein the image-text similarity matrix is a zero-shot classifier.

19. The system of claim 15, wherein the text encoder and the image encoder are both CLIP encoders.

20. The system of claim 15, wherein the processor is further programmed to, in response to not meeting the threshold, further adjust parameters of the image encoder.

* * * * *